(12) United States Patent
Zhou et al.

(10) Patent No.: US 8,321,058 B2
(45) Date of Patent: Nov. 27, 2012

(54) HVAC CONTROL SYSTEM HAVING INTEGRATED CPH CYCLING CONTROL AND DEADBAND STAGING

(75) Inventors: John Q. Zhou, Onalaska, WI (US); Bert L. Feinberg, Clarksville, TN (US); Randy L. Henk, White Bear Lake, MN (US)

(73) Assignee: Trane International Inc., Piscataway, NJ (US)

( * ) Notice: Subject to any disclaimer, the term of this patent is extended or adjusted under 35 U.S.C. 154(b) by 210 days.

(21) Appl. No.: 12/889,822

(22) Filed: Sep. 24, 2010

(65) Prior Publication Data

US 2012/0078423 A1   Mar. 29, 2012

(51) Int. Cl.
*G05B 13/00* (2006.01)
*G05B 15/00* (2006.01)
*G05D 23/00* (2006.01)
*G05D 23/19* (2006.01)
*F24F 7/00* (2006.01)
*B60H 1/00* (2006.01)

(52) U.S. Cl. ...... 700/278; 700/296; 236/46 C; 236/49.3; 236/51; 236/91 C; 236/91 D (58) Field of Classification Search .................. 700/275, 700/276, 278, 286, 295, 296; 236/1 C, 46 C, 236/49.3, 51, 91 C, 91 D
See application file for complete search history.

(56) References Cited

U.S. PATENT DOCUMENTS

| | | | |
|---|---|---|---|
| 4,387,763 A | 6/1983 | Benton | |
| 4,477,018 A | 10/1984 | Rathgeber | |
| 4,489,882 A | 12/1984 | Rodgers | |
| 4,589,060 A | 5/1986 | Zinsmeyer | |
| 4,634,046 A | 1/1987 | Tanaka | |
| 4,718,021 A | 1/1988 | Timblin | |
| 4,901,918 A | 2/1990 | Grald et al. | |
| 5,002,226 A | 3/1991 | Nelson | |
| 7,621,141 B2 | 11/2009 | McCormick et al. | |
| 8,090,477 B1* | 1/2012 | Steinberg | 700/278 |
| 2010/0280665 A1* | 11/2010 | Fildes et al. | 700/275 |
| 2010/0282857 A1* | 11/2010 | Steinberg | 236/49.3 |
| 2011/0290893 A1* | 12/2011 | Steinberg | 236/49.3 |
| 2012/0086562 A1* | 4/2012 | Steinberg | 340/12.32 |

OTHER PUBLICATIONS

Wulfinghoff, Donald R., 4.3.4.2 Install deadband thermostats, Energy Efficiency Manual, 2003, pp. 600-602, Energy Institute Press, http://www.energybooks.com/Cover.htm.

* cited by examiner

*Primary Examiner* — Crystal J Barnes-Bullock
(74) *Attorney, Agent, or Firm* — Michael Best & Friedrich LLP (57) ABSTRACT

A method of controlling an HVAC system including programming a thermostat of the HVAC system to define a temperature set point, a temperature differential around the temperature set point, and a number of cycles per hour for a temperature control source of the HVAC system. The method also includes sensing a temperature, executing a cycling control algorithm that includes the temperature, the temperature set point, and the number of cycles per hour as inputs to determine a duty cycle, and running the temperature control source according to the duty cycle when the temperature is within the temperature differential. The method further includes executing a deadband algorithm to turn on the temperature control source when the temperature is outside of the temperature differential at one extreme and to turn off the temperature control source when the temperature is outside the temperature differential at the opposite extreme.

20 Claims, 4 Drawing Sheets

HVAC CONTROL SYSTEM HAVING INTEGRATED CPH CYCLING CONTROL AND DEADBAND STAGING

BACKGROUND

The present invention relates to heating, ventilation, and air conditioning ("HVAC") systems, and more particularly to HVAC control systems.

Users typically expect a thermostat for a heating, ventilation, and air conditioning (HVAC) system to keep a controlled temperature within 1° F. (0.5° C.) of a temperature set point. Typically, thermostats use either cycle per hour (CPH) control or deadband control to meet this user expectation. CPH control sets a number of times (cycles) that the HVAC system is turned on within one hour. One disadvantage to CPH control is that although it will typically provide an average temperature near the set point, the sensed temperature may sometimes overshoot the set point by more than 1° F. (0.5° C.). Alternatively, deadband control simply turns the HVAC system ON or OFF based on a comparison of the sensed temperature to a predetermined temperature below the temperature set point and a predetermined temperature above the temperature set point. Deadband control, particularly for multi-stage HVAC systems, can result in the output temperature shifting away from the temperature set point. Therefore, overshooting the temperature set point and set point shifting are common problems associated with the alternative control systems of the known thermostats.

SUMMARY

The present invention provides, in one aspect, a method of controlling a heating, ventilation, and air-conditioning ("HVAC") system. The method includes programming a thermostat of the HVAC system to define a temperature set point, a temperature differential around the temperature set point, and a number of cycles per hour for a temperature control source of the HVAC system. The method also includes sensing a temperature, executing a cycling control algorithm that includes the temperature, the temperature set point, and the number of cycles per hour as inputs to determine a duty cycle, and running the temperature control source according to the duty cycle when the temperature is within the temperature differential. The method further includes executing a deadband algorithm to turn on the temperature control source when the temperature is outside of the temperature differential at one extreme and to turn off the temperature control source when the temperature is outside the temperature differential at the opposite extreme.

The present invention provides, in another aspect, a thermostat for controlling a temperature control source. The thermostat includes a temperature sensor operable to sense a temperature within a room and to generate a signal representative of the temperature and a controller in electronic communication with the temperature sensor and configured to receive the signal. The controller is configured to define a temperature set point, a temperature differential around the temperature set point, and a number of cycles per hour for the temperature control source. The controller is configured to determine a duty cycle by executing a cycling control algorithm that includes the temperature, the temperature set point, and the number of cycles per hour as inputs. The controller is configured to run the temperature control source according to the duty cycle when the temperature is within the temperature differential. The controller is also configured to execute a deadband algorithm to turn on the temperature control source when the temperature is outside of the temperature differential at one extreme and to turn off the temperature control source when the temperature is outside the temperature differential at the opposite extreme.

The present invention provides, in another aspect, a thermostat for controlling a heating source and a cooling source. The thermostat includes a temperature sensor operable to sense a temperature within a room and to generate a signal representative of the temperature and a controller in electronic communication with the temperature sensor and configured to receive the signal. The controller is configured to define a heating temperature set point, a heating temperature differential around the heating temperature set point, a heating number of cycles per hour for the heating source, a cooling temperature set point, a cooling temperature differential around the cooling set point, and a cooling number of cycles per hour for the cooling source. The controller is configured to determine a heating duty cycle by executing a heating cycling control algorithm that includes the temperature, the heating temperature set point, and the heating number of cycles per hour as inputs. The controller is configured to run the heating source according to the heating duty cycle when the temperature is within the heating temperature differential. The controller is configured to determine a cooling duty cycle by executing a cooling cycling control algorithm that includes the temperature, the cooling temperature set point, and the cooling number of cycles per hour as inputs. The controller is also configured to execute a deadband algorithm to turn on the heating source when the temperature is less than the heating temperature differential, to turn off the heating source when the temperature is greater than the heating temperature differential, to turn on the cooling source when the temperature is greater than the cooling temperature differential, and to turn off the cooling source when the temperature is less than the cooling temperature differential.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
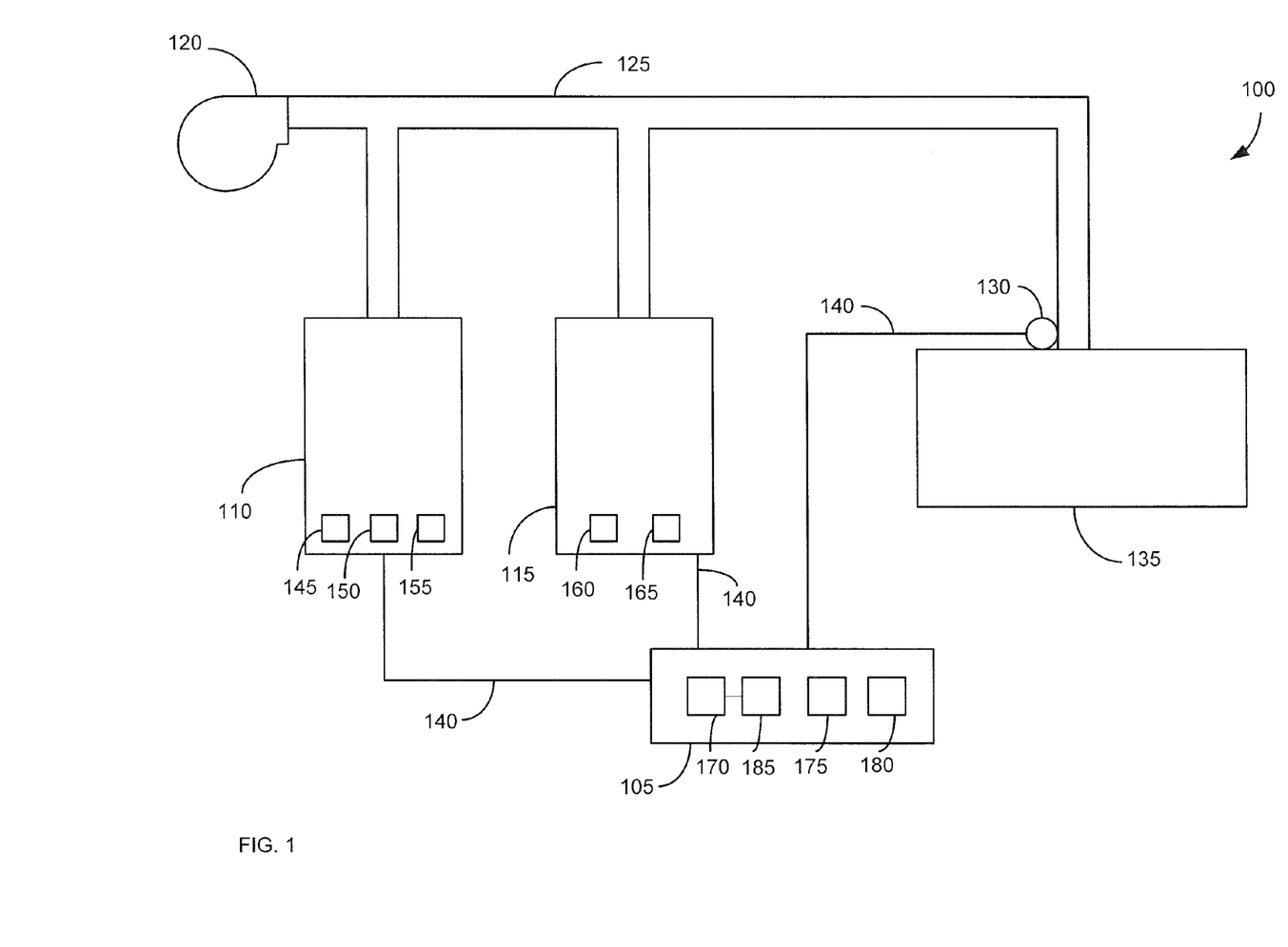
FIG. 1 is a schematic illustration of a temperature control system.

As illustrated in FIG. 1, a temperature control system 100 includes a thermostat 105, a temperature control source or heating source 110, a second temperature control source or cooling source 115, a fan 120, a system of ventilation ducts 125, and a temperature sensor 130. The temperature control system 100 operates to heat and cool a space 135, for example a room, house, apartment, office building, or other building occupied by people. The heating source 110 and the cooling source 115 are fluidly connected to the space 135 by the system of ventilation ducts 125. The fan 120 forces air through the system of ventilation ducts 125. FIG. 1 is a schematic representation of the temperature control system and other fan arrangements are considered to effectively move the heated or cooled air to the space 135. In addition, further ducting may be provided to allow air to return from the space 135 to the heating and cooling sources 110, 115.

The thermostat 105 is operatively connected to the heating source 110, the cooling source 115, and the temperature sensor 130. This operative connection can be made with wires 140 or wirelessly to allow the thermostat 105 to electronically communicate with the heating source 110, the cooling source 115, and the temperature sensor 130. The temperature sensor 130 senses the temperature of the air in or near the space 135. The temperature sensor 130 sends a signal indicating the sensed temperature to the thermostat 105. The heating source 110 can be a furnace, a heat pump, a furnace and a heat pump, a boiler, or other heating devices, alone or in combination. The cooling source 115 can be an air conditioner, a heat pump, an air conditioner and a heat pump, or other cooling devices, alone or in combination. Preferably, the heating source 110 is a furnace including a first heating stage 145, a second heating stage 150, and a third heating stage 155. In other embodiments, the furnace includes more heating stages or fewer heating stages. Preferably, the cooling source 115 is an air conditioner with a first cooling stage 160 and a second cooling stage 165. In other embodiments, the air conditioner includes more cooling stages or fewer cooling stages.

The thermostat 105 includes a controller 170, a user interface 175, and a power supply 180. The controller 170 includes (or is connected to) memory 185 such as RAM and ROM and executes software (including, for example, algorithms) that can be stored in the RAM (particularly during execution), the ROM (on a generally permanent basis), or another non-transitory computer readable medium such as other memory or disc. If necessary, the controller 170 can be connected to such memory or a disc drive to read such software. A microprocessor or other programmable device with suitable memory and I/O devices could also be used. The user interface 175 includes a display and an input device. The input device can be a keypad, touch screen, or other appropriate device that allows a user to input data to the thermostat 105.

A user sets one of a heating set point and a cooling set point, as well as a deadband with the user interface 175. The heating set point is the desired heated air temperature in the space 135. The cooling set point is the desired cooled air temperature in the space 135. The deadband is the temperature range between the heating set point and the cooling set point. The deadband exists when the cooling set point is greater than the heating set point. In one embodiment, when the user adjusts one of the heating set point and the cooling set point, the other of the heating set point and the cooling set point is also adjusted according to the deadband. In other embodiments, the deadband is increased or decreased according to the changes made to either the heating set point of the cooling set point. In some embodiments, the deadband is temperature range adjustable between 2° F. and 9° F. (1° C. and 4.5° C.).

The user also sets a number of cycles per period of time for each of the heating stages 145, 150, and 155. Typically, this is expressed as cycles per hour (CPH). The number of cycles is the number of times the heating source 110 is turned on in one hour. The number of cycles per hour divides an hour into that number of cycles for the corresponding heating stage 145, 150, and 155. For example, if heating stage one 145 is set to five CPH, then it runs at twelve-minute cycles with a variable duty cycle. Preferably, there are ten CPH options (1-10) for each heating state 145, 150, and 155. The user also sets a number of cycles per hour for each of the cooling stages 160 and 165. The number of cycles per hour divides an hour into a number of cycles for the corresponding cooling stage 160 and 165. Preferably, there are five CPH options (1-5) for each cooling stage 160 and 165.

A temperature differential is set by the user with the user interface 175 or permanently stored in the controller 170. A heating temperature differential is the temperature range between the heating set point minus the temperature differential and the heating set point plus the temperature differential. A cooling temperature differential is the temperature range between the cooling set point minus the temperature differential and the cooling set point plus the temperature differential. Preferably, the temperature differential is permanently stored as 1° F. (0.5° C.).

A heating cycling control algorithm is used to control the heating source 110 when the sensed temperature is within the heating temperature differential. The heating cycling control algorithm runs the heating source 110 according to the number of cycles per hour with a variable duty cycle. The heating cycling control algorithm includes a proportional-integral (PI) loop that uses the sensed temperature and the heating set point as inputs. A PI loop is a feedback control algorithm which drives the system to be controlled with a weighted sum of the error (the difference between the output—here, the sensed temperature—and the desired set point) and the integral of that value. The heating PI loop determines the required heating source capacity from the heating source 110 in order to maintain the sensed temperature at the heating set point. The heating control algorithm calculates the appropriate heating stage capacity for each of the heating stages 145, 150, and 155 to meet the required heating source capacity. The heating control algorithm also calculates the appropriate duty cycle for each of the heating stages 145, 150, and 155 depending on the corresponding heating stage capacity. The heating cycling control algorithm uses the minimum number of heating stages 145, 150, and 155 needed to meet the required heating source capacity. For example, if the heating source 110 is a two-stage furnace and the required heating source capacity is less than 50% of the furnace's total heating source capacity, then the second heating stage 150 is not used. However, when the required heating source capacity is greater than 50% of the furnace's total heating source capacity, then both the first stage 145 and the second heating stage 150 are used. A duty cycle is variable from 0% (off for the entire cycle) to 100% (on for the entire cycle).

A cooling cycling control algorithm is used to control the cooling source 115 when the sensed temperature is within the cooling temperature differential. The cooling cycling control algorithm runs the cooling source 115 according to the number of cycles per hour with a variable duty cycle. The cooling cycling control algorithm includes a proportional-integral (PI) loop that uses the sensed temperature and the cooling set point as inputs. The cooling PI loop determines the required cooling source capacity from the cooling source 115 in order to maintain the sensed temperature at the cooling set point. The cooling control algorithm calculates the appropriate cooling stage capacity for each of the cooling stages 160 and 165 to meet the required cooling source capacity. The cooling control algorithm also calculates the appropriate duty cycle for each of the cooling stages 160 and 165 depending on the corresponding cooling stage capacity. The cooling cycling control algorithm uses the minimum number of cooling stages 160 and 165 needed to meet the required heating source capacity. A duty cycle is variable from 0% (off for the entire cycle) to 100% (on for the entire cycle). In some embodiments, the cooling cycling control algorithm includes a minimum time off requirement that ensures a set amount of time off for the cooling stage every time the cooling stage is turned off, a minimum time on requirement that ensures a set amount of time on for the cooling stage every time the cooling stage is turned on, or both of these requirements. For example, the compressor of an air conditioner may have a minimum time off requirement to protect the compressor from restarting without sufficient oil in the compressor. The minimum time off and minimum time on requirements are included in the determination of the duty cycle for each cooling stage 160 and 165. For example, for a one-stage air conditioner with a minimum time off of three minutes and the thermostat 105 set for two cooling cycles per hour, the air conditioner would run in thirty minute cycles. If the calculated duty cycle without a minimum time off requirement would be 95% (28.5 minutes on and 1.5 minutes off), then the actual duty cycle taking into account the minimum time off would be 90% (twenty-seven minutes on and three minutes off).

A deadband algorithm controls the heating source 110 and the cooling source 115 when the sensed temperature is not within either the heating temperature differential or the cooling temperature differential. When the sensed temperature is below the heating temperature differential, the heating source 110 is turned on so that all three heating stages 145, 150, and 155 are on. When the sensed temperature is between the heating temperature differential and the cooling temperature differential, both the heating source 110 and the cooling source 115 are turned off. When the sensed temperature is above the cooling temperature differential, the cooling source 115 is turned on so that both cooling stages 160 and 165 are turned on. In some embodiments, the deadband algorithm includes heating stage delay timers (set to, for example, one minute) to sequentially turn on the three heating stages 145, 150, and 155 at set intervals when the sensed temperature is below the heating temperature differential. In other embodiments, similar cooling stage delay timers are included to sequentially turn on the two cooling stages 160 and 165 at set intervals when the sensed temperature is above the cooling temperature differential. The deadband algorithm does not override the minimum time off requirements for either the heating source 110 or the cooling source 115. The heating source 110 or cooling source 115 will still be turned off for the minimum time off requirement even when under deadband algorithm control.

The heating PI loop and the cooling PI loop run continuously. Both PI loops continuously update the weighted sum of the error (the difference between the sensed temperature and the corresponding set point) and the integral of that value. This ensures a smooth transition when control of the system 100 switches between the deadband algorithm and either the heating cycling control algorithm or the cooling cycling control algorithm.

For example, consider a situation where the heating set point is 68° F. and the heating temperature differential is between 67° F. and 69° F. and the sensed temperature shifts from 68° F. to 65° F. and then back to 68° F. Now, assume that the heating PI loop does not run continuously. As the sensed temperature shifts from 68° F. to 65° F., control of the heating source 110 passes from the heating cycling control algorithm to the deadband algorithm when the sensed temperature is less than 67° F. Therefore, the last sensed temperature value input to the heating PI loop is 67° F. and the error is 1° F. As the sensed temperature shifts from 65° F. back to 68° F., control of the heating source 110 passes from the deadband algorithm to the heating cycling control algorithm when the sensed temperature is equal to 67° F. Therefore, the next sensed temperature value input to the heating PI loop is 67° F. and the error is 1° F. In this situation, the sum (integral) of the two most recent errors is 2° F. Now, assume that the heating PI loop does run continuously and the sensed temperature is input into the heating PI loop even while the heating source 110 is controlled by the deadband algorithm. As the sensed temperature shifts from 65° F. back to 68° F., control of the heating source 110 passes from the deadband algorithm to the heating cycling control algorithm when the sensed temperature is equal to 67° F. While the sensed temperature is greater than 67° F., the error will always be greater than 1° F. and at 67° F. the error will be equal to 1° F. Therefore, the sum (integral) of the last error under deadband algorithm control and the first error under heating cycling control algorithm control will always be greater than 2° F. Continuously running the PI loops therefore ensures that the calculated integral value of each PI loop is an accurate reflection of the performance of the system 100 as it relates to the sensed temperature.

Additionally, the thermostat 105 can run in a heating-only mode where the cooling source 115 cannot be turned on. The thermostat 105 can also run in a cooling-only mode where the heating source 110 cannot be turned on.

Figure 2:
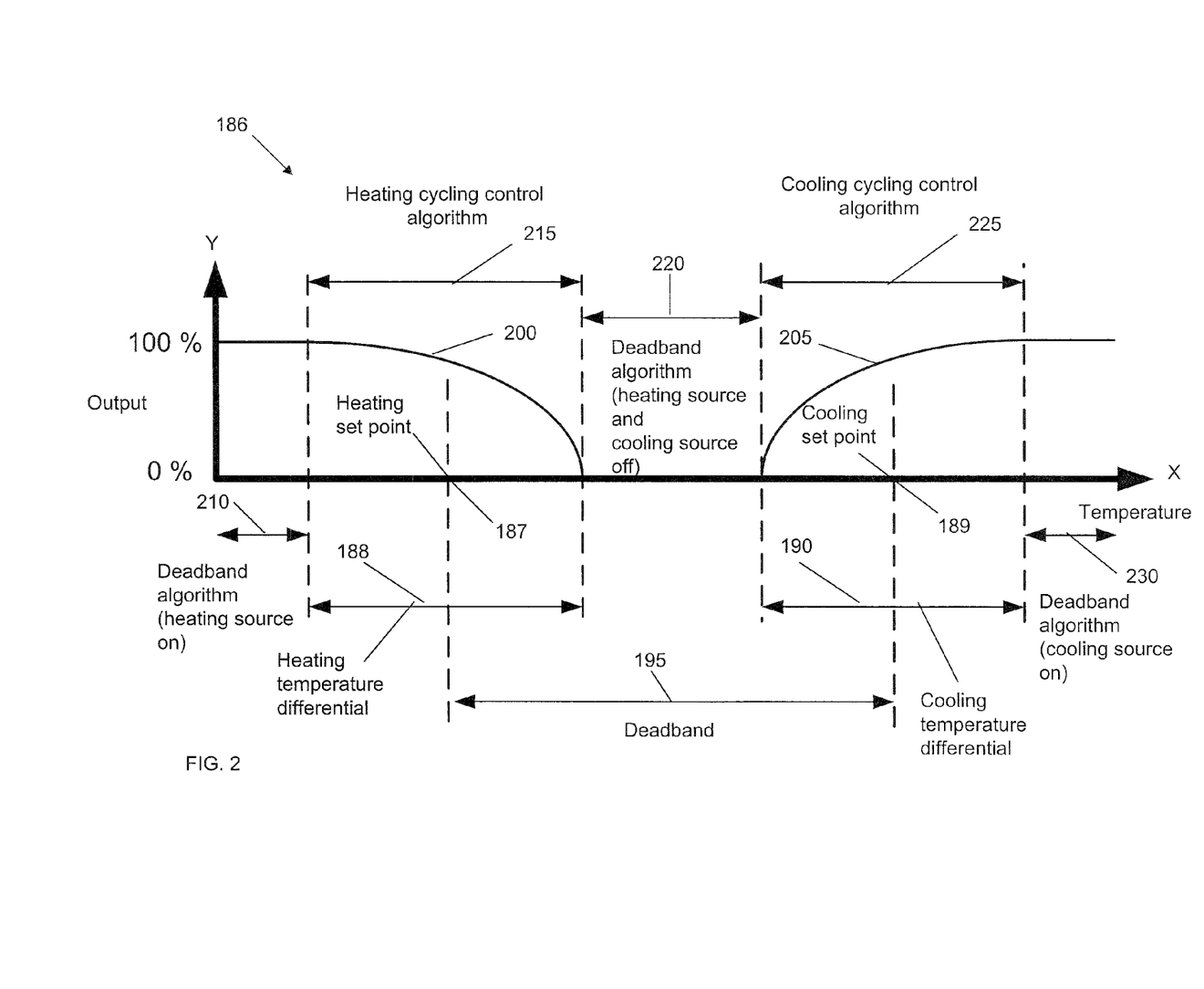
FIG. 2 is a graph illustrating heating source and cooling source outputs as a function of sensed temperature.

FIG. 2 includes a graph 186 showing heating source and cooling source output from 0-100% (vertical axis Y) as a function of sensed temperature (horizontal axis X). The graph 186 includes a heating setpoint 187, a heating temperature differential 188, a cooling set point 189, a cooling temperature differential 190, and a deadband 195. A first line 200 illustrates the heating source output. A second line 205 illustrates the cooling source output.

In a first temperature range 210, the deadband algorithm controls the heating source 110 so that the heating source 110 is constantly on. In a second temperature range 215, the heating cycling control algorithm controls the heating source 110 with variable duty cycles for each of the heating stages 145, 150, and 155. In a third temperature range 220, the deadband algorithm controls the heating source 110 and the cooling source 115 so that both the heating source 110 and the cooling source 115 are off. In a fourth temperature range 225, the cooling control algorithm controls the cooling source 115 with variable duty cycles for both of the cooling stages 160 and 165. In a fifth temperature range 230, the deadband algorithm controls the cooling source 115 so that the cooling source 115 is constantly on.

Figure 3:
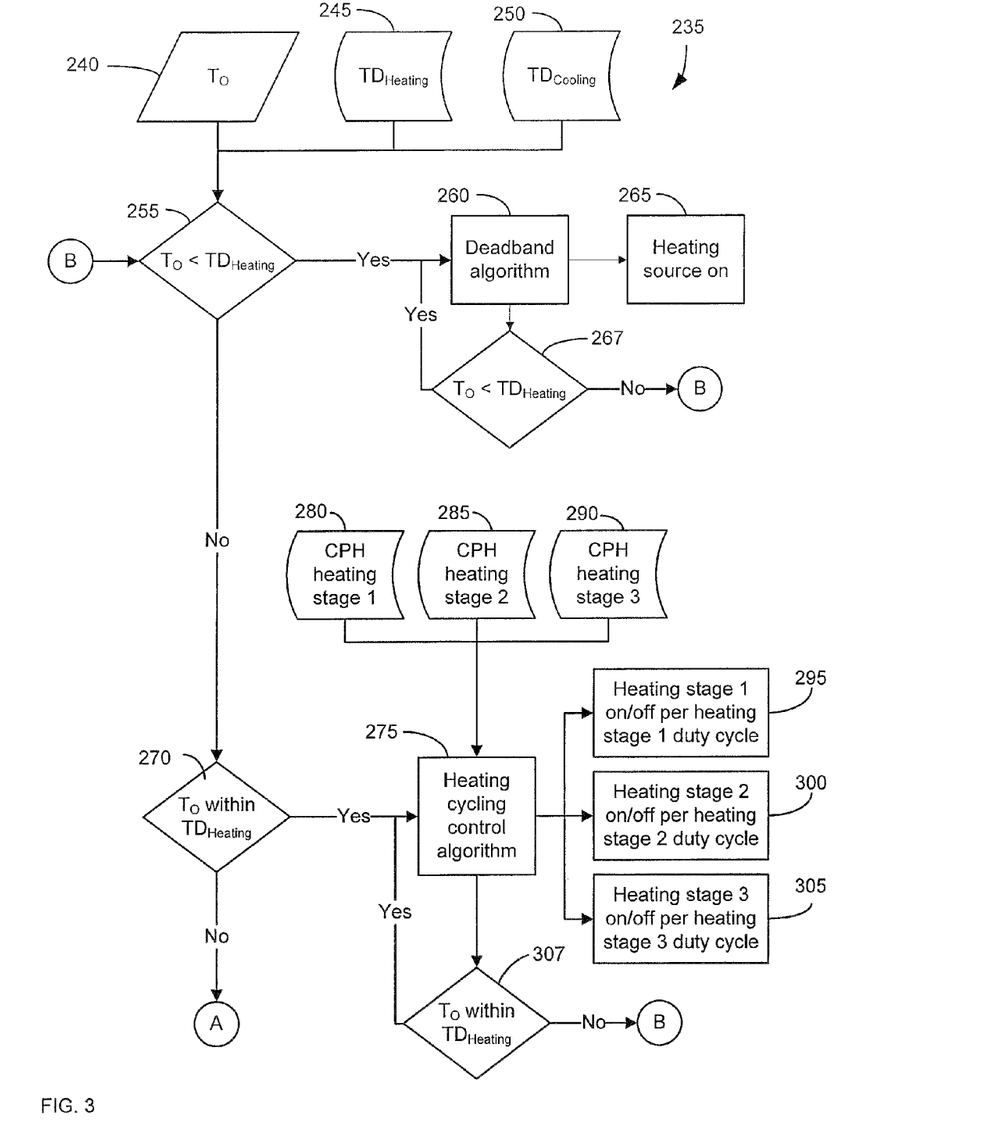
FIG. 3 partially illustrates a process for controlling the heating and cooling sources of FIG. 1.
Figure 4:
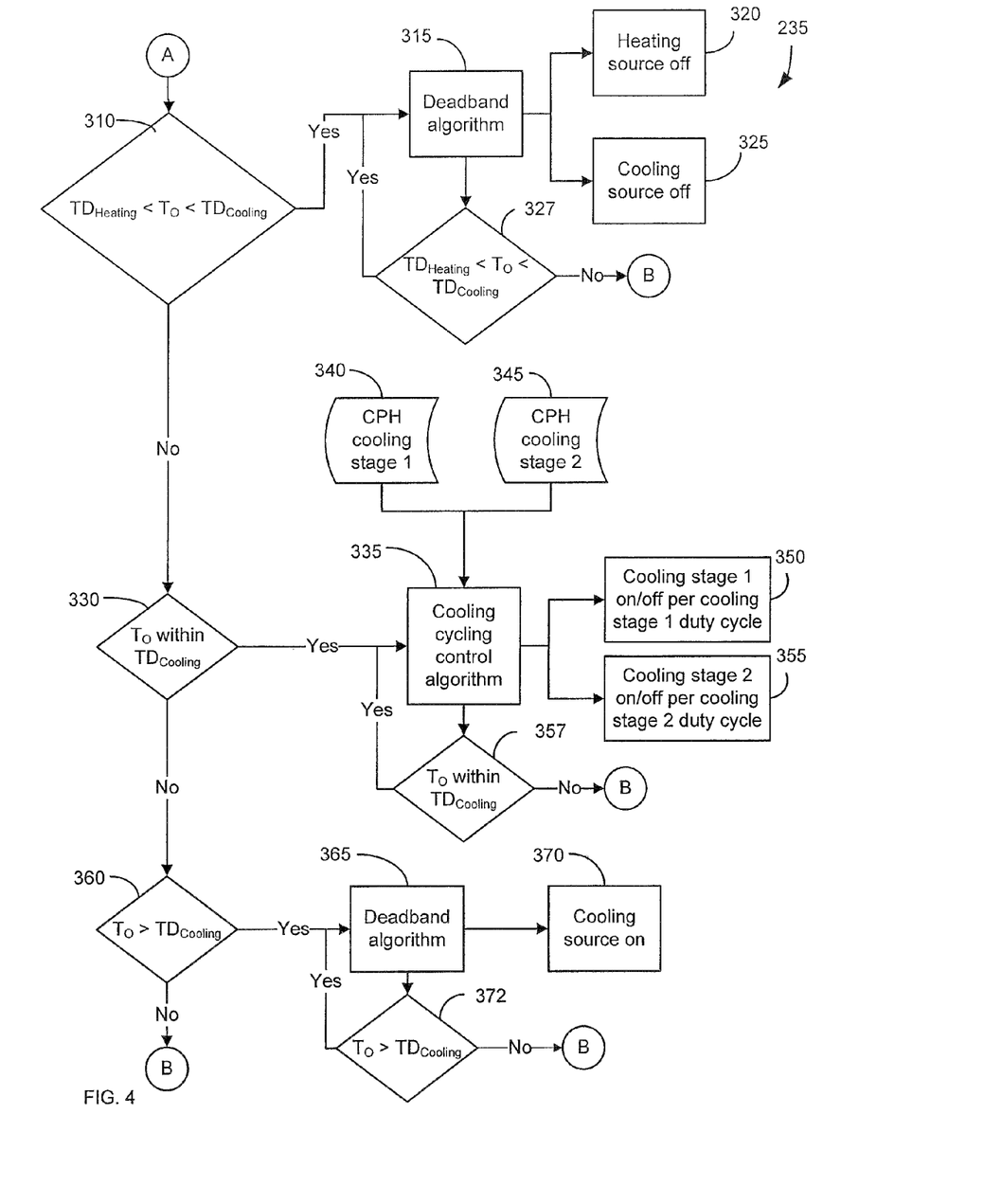
FIG. 4 partially illustrates a process for controlling the heating and cooling sources of FIG. 1.

FIGS. 3 and 4 depict a process 235 for controlling the sensed temperature of the temperature control system 100. As shown in FIG. 3, the sensed temperature ($T_s$) 240 sensed by the temperature sensor 130 is compared with the heating temperature differential ($TD_{Heating}$) 245 and the cooling temperature differential ($TD_{Cooling}$) 250. Step 255 determines if the sensed temperature 240 is less than the heating temperature differential 245. When the sensed temperature 240 is less than the heating temperature differential 245 the controller 170 executes the deadband algorithm 260 to turn on 265 the heating source 110. If the sensed temperature is not less than the heating temperature differential 245, the controller proceeds to step 270. While the sensed temperature 240 is less than the heating temperature differential 245, step 267 causes the controller 170 to continue to execute the deadband algorithm 260. When the sensed temperature 240 is no longer less than the heating temperature differential 245, step 267 returns the controller 170 to step 255.

Step 270 determines if the sensed temperature 240 is within the heating temperature differential 245. When the sensed temperature 240 is within the heating temperature differential 245 the controller 170 executes the heating cycling control algorithm 275. If the sensed temperature is not within the heating temperature differential 245 the controller 170 proceeds to step 310. The CPH setting 280 for the first heating stage 145, the CPH setting 285 for the second heating stage 150, and the CPH setting 290 for the third heating stage 155 are data inputs for the heating cycling control algorithm 275. The heating cycling control algorithm 275 calculates the appropriate duty cycle for each of the heating stages 145, 150, and 155 depending on the required heating source capacity from the heating source 110 in order for the sensed temperature 240 to reach and maintain the heating set point. The first heating stage 145 is turned on and off according to the first heating stage duty cycle 295. The second heating stage 150 is turned on and off according to the second heating stage duty cycle 300. The third heating stage 155 is turned on and off according to the third heating stage duty cycle 305. While the sensed temperature 240 is within the heating temperature differential 245, step 307 causes the controller 170 to continue to execute the heating cycling control algorithm 275. When the sensed temperature 240 is no longer within the heating temperature differential 245, step 307 returns the controller 170 to step 255.

As shown in FIG. 4, step 310 determines if the sensed temperature 240 is between the heating temperature differential 245 and the cooling temperature differential 250. When the sensed temperature 240 is between the heating temperature differential 245 and the cooling temperature differential 250 the controller 170 executes the deadband algorithm 315 to turn off 320 the heating source 110 and to turn off 325 the cooling source 115. If the sensed temperature 240 is not between the heating temperature differential 245 and the cooling temperature differential 250, the controller 170 proceeds to step 330. While the sensed temperature 240 is between the heating temperature differential 245 and the cooling temperature differential 250, step 327 causes the controller 170 to continue to execute the deadband algorithm 315. When the sensed temperature 240 is no longer between the heating temperature differential 245 and the cooling temperature differential 250, step 327 returns the controller 170 to step 255.

Step 330 determines if the sensed temperature 240 is within the cooling temperature differential 250. When the sensed temperature 240 is within the cooling temperature differential 250 the controller 170 executes the cooling cycling control algorithm 335. If the sensed temperature 240 is not within the cooling temperature differential 250, the controller 170 proceeds to step 360. The CPH setting 340 for the first cooling stage 160 and the CPH setting 345 for the second cooling stage 165 are data inputs for the cooling cycling control algorithm 335. The cooling cycling control algorithm 335 calculates the appropriate duty cycle for each of the cooling stages 160 and 165 depending on the cooling load required from the cooling source 115 in order for the sensed temperature 240 to reach and maintain the cooling set point. The first cooling stage 160 is turned on and off according to the first cooling stage duty cycle 350. The second cooling stage 165 is turned on and off according to the second cooling stage duty cycle 355. While the sensed temperature 240 is within the cooling temperature differential 250, step 357 causes the controller 170 to continue to execute the cooling cycling control algorithm 335. When the sensed temperature 240 is no longer within the cooling temperature differential 250, the controller 170 returns to step 255.

Step 360 determines if the sensed temperature 240 is greater than the cooling temperature differential 245. When the sensed temperature 240 is greater than the cooling temperature differential 245 the controller 170 executes the deadband algorithm 365 to turn on 370 the cooling source 115. If the sensed temperature 240 is not greater than the cooling temperature differential 245, the controller 170 returns to step 255. While the sensed temperature 240 is greater than the cooling temperature differential 245, step 372 causes the controller 170 to continue to execute the deadband algorithm 365. When the sensed temperature 240 is not greater than the cooling temperature differential 245, the controller 170 returns to step 255.

The process 235 is looped so that the sensed temperature 240 is repeatedly compared to the heating temperature differential 245 and the cooling temperature differential 250. Preferably, the process 235 runs once every ten seconds. In other embodiments, the process 235 runs more or less frequently.

Various features of the invention are set forth in the following claims.

What is claimed is:

1. A method of controlling a heating, ventilation, and air-conditioning ("HVAC") system, the method comprising:
    programming a thermostat of the HVAC system to define a temperature set point, a temperature differential around the temperature set point, and a number of cycles per hour for a temperature control source of the HVAC system;
    sensing a temperature;
    executing a cycling control algorithm that includes the temperature, the temperature set point, and the number of cycles per hour as inputs to determine a duty cycle;
    running the temperature control source according to the duty cycle when the temperature is within the temperature differential; and
    executing a deadband algorithm to turn on the temperature control source when the temperature is outside of the temperature differential at one extreme and to turn off the temperature control source when the temperature is outside the temperature differential at the opposite extreme.

2. The method of claim 1, further comprising the step of:
    executing a proportional-integral loop as a component of the cycling control algorithm, the proportional-integral loop including the temperature and the temperature set point as inputs to determine a required source capacity from the temperature control source.

3. The method of claim 2, further comprising the step of:
    executing, continuously, the proportional-integral loop.

4. The method of claim 2, wherein the temperature control source includes a plurality of stages and further comprising the steps of:
    executing the cycling control algorithm to determine a required stage capacity for each of the plurality of stages based on the required source capacity;
    executing the cycling control algorithm to determine a stage duty cycle for each of the plurality of stages based on the corresponding required stage capacity.

5. The method of claim 1, further comprising the steps of:
    programming the thermostat to define a second temperature set point, a second temperature differential around the second temperature set point, and a second number of cycles per hour for a second temperature control source of the HVAC system;
    executing a second cycling control algorithm that includes the temperature, the second temperature set point, and the second number of cycles per hour as inputs to determine a second duty cycle;

running the second temperature control source according to the second duty cycle when the temperature is within the second temperature differential; and executing the deadband algorithm to turn on the second temperature control source when the temperature is outside of the second temperature differential at one extreme and to turn off the second temperature control source when the temperature is outside the second temperature differential at the opposite extreme.

6. The method of claim 5, further comprising the step of:
executing a proportional-integral loop as a component of the cycling control algorithm, the proportional-integral loop including the temperature and the temperature set point as inputs to determine a required source capacity from the temperature control source.

7. The method of claim 6, further comprising the step of:
executing a second proportional-integral loop as a component of the second cycling control algorithm, the second proportional-integral loop including the temperature and the second temperature set point as inputs to determine a second required source capacity from the second temperature control source.

8. The method of claim 7, further comprising the steps of:
executing, continuously, the proportional-integral loop; and
executing, continuously, the second proportional-integral loop.

9. The method of claim 6, wherein the temperature control source includes a plurality of stages and further comprising the steps of:
executing the cycling control algorithm to determine a required stage capacity for each of the plurality of stages based on the required source capacity;
executing the cycling control algorithm to determine a stage duty cycle for each of the plurality of stages based on the corresponding required stage capacity.

10. The method of claim 9, wherein the second temperature control source includes a plurality of second stages and further comprising the steps of:
executing the second cycling control algorithm to determine a second required stage capacity for each of the plurality of second stages based on the second required source capacity;
executing the second cycling control algorithm to determine a second stage duty cycle for each of the plurality of second stages based on the corresponding second required stage capacity.

11. The method of claim 10, further comprising the steps of:
programming the thermostat to define a second temperature set point by setting a deadband that separates the temperature set point from the second temperature set point.

12. The method of claim 10, further comprising the steps of:
executing, continuously, the proportional-integral loop; and
executing, continuously, the second proportional-integral loop.

13. The method of claim 12, wherein the temperature control source is a heating source and wherein the second temperature control source is a cooling source.

14. A thermostat for controlling a temperature control source, the thermostat comprising:
a temperature sensor operable to sense a temperature within a room and to generate a signal representative of the temperature; and
a controller in electronic communication with the temperature sensor and configured to receive the signal;
wherein the controller is configured to define a temperature set point, a temperature differential around the temperature set point, and a number of cycles per hour for the temperature control source,
wherein the controller is configured to determine a duty cycle by executing a cycling control algorithm that includes the temperature, the temperature set point, and the number of cycles per hour as inputs,
wherein the controller is configured to run the temperature control source according to the duty cycle when the temperature is within the temperature differential, and
wherein the controller is configured to execute a deadband algorithm to turn on the temperature control source when the temperature is outside of the temperature differential at one extreme and to turn off the temperature control source when the temperature is outside the temperature differential at the opposite extreme.

15. The thermostat of claim 14, wherein the cycling control algorithm includes a proportional-integral loop having the temperature and the temperature set point as inputs to determine a required source capacity from the temperature control source.

16. The thermostat of claim 14, wherein the controller is configured to continuously execute the proportional-integral loop.

17. A thermostat for controlling a heating source and a cooling source, the thermostat comprising:
a temperature sensor operable to sense a temperature within a room and to generate a signal representative of the temperature; and
a controller in electronic communication with the temperature sensor and configured to receive the signal;
wherein the controller is configured to define a heating temperature set point, a heating temperature differential around the heating temperature set point, a heating number of cycles per hour for the heating source, a cooling temperature set point, a cooling temperature differential around the cooling set point, and a cooling number of cycles per hour for the cooling source,
wherein the controller is configured to determine a heating duty cycle by executing a heating cycling control algorithm that includes the temperature, the heating temperature set point, and the heating number of cycles per hour as inputs,
wherein the controller is configured to run the heating source according to the heating duty cycle when the temperature is within the heating temperature differential,
wherein the controller is configured to determine a cooling duty cycle by executing a cooling cycling control algorithm that includes the temperature, the cooling temperature set point, and the cooling number of cycles per hour as inputs, and
wherein the controller is configured to execute a deadband algorithm to turn on the heating source when the temperature is less than the heating temperature differential, to turn off the heating source when the temperature is greater than the heating temperature differential, to turn on the cooling source when the temperature is greater than the cooling temperature differential, and to turn off the cooling source when the temperature is less than the cooling temperature differential.

18. The thermostat of claim 17, wherein the heating cycling control algorithm includes a heating proportional-integral loop having the temperature and the heating temperature set point as inputs to determine a required heating source capacity from the heating source, and     wherein the cooling cycling control algorithm includes a cooling proportional-integral loop having the temperature and the cooling temperature set point as inputs to determine a required cooling source capacity from the cooling source.

19. The thermostat of claim 18, wherein the heating source includes a plurality of heating stages,     wherein the cooling source includes a plurality of cooling stages,     wherein the controller is configured to determine a heating stage capacity for each of the plurality of heating stages based on the required heating source capacity by executing the heating cycling control algorithm,     wherein the controller is configured to determine a heating stage duty cycle for each of the plurality of heating stages based on the corresponding heating stage capacity by executing the heating cycling control algorithm,     wherein the controller is configured to determine a cooling stage capacity for each of the plurality of cooling stages based on the required cooling source capacity by executing the cooling cycling control algorithm, and     wherein the controller is configured to determine a cooling stage duty cycle for each of the plurality of cooling stages based on the corresponding cooling stage capacity by executing the cooling cycling control algorithm.

20. The thermostat of claim 19, wherein the controller is configured to continuously execute the heating proportional-integral loop, and     wherein the controller is configured to continuously execute the cooling proportional-integral loop.

\* \* \* \* \*